(12) United States Patent
Harada (10) Patent No.: US 8,307,505 B2
(45) Date of Patent: Nov. 13, 2012

(54) ROTATION CONTROL DEVICE FOR ROTATION BODY

(75) Inventor: Akinori Harada, Fujisawa (JP)

(73) Assignee: Nifco Inc., Yokohama-Shi (JP)

( * ) Notice: Subject to any disclaimer, the term of this patent is extended or adjusted under 35 U.S.C. 154(b) by 488 days.

(21) Appl. No.: 12/450,158

(22) PCT Filed: Mar. 10, 2008

(86) PCT No.: PCT/JP2008/054322
§ 371 (c)(1),
(2), (4) Date: Oct. 9, 2009

(87) PCT Pub. No.: WO2008/111565
PCT Pub. Date: Sep. 18, 2008

(65) Prior Publication Data
US 2010/0101046 A1   Apr. 29, 2010

(30) Foreign Application Priority Data

Mar. 13, 2007  (JP) ................................. 2007-063585

(51) Int. Cl.
*E05F 1/08* (2006.01)
(52) U.S. Cl. ............................................ 16/293; 16/354
(58) Field of Classification Search .............. 16/64, 291, 16/293, 354, 295; 296/37.8, 37.12; 312/322, 312/323
See application file for complete search history.

(56) References Cited

U.S. PATENT DOCUMENTS

| | | | | |
|---|---|---|---|---|
| 4,239,277 A | * | 12/1980 | Oda | 296/37.12 |
| 5,620,122 A | * | 4/1997 | Tanaka | 224/275 |
| 6,609,631 B2 | * | 8/2003 | Asami | 220/817 |
| 6,926,332 B2 | * | 8/2005 | Youngs et al. | 296/37.13 |
| 7,407,200 B2 | * | 8/2008 | Ichimaru | 292/194 |
| 7,566,084 B2 | * | 7/2009 | Kikuchi | 296/37.8 |
| 2004/0093693 A1 | * | 5/2004 | Salice | 16/354 |
| 2005/0252759 A1 | * | 11/2005 | Ichimaru | 200/523 |

FOREIGN PATENT DOCUMENTS

| | | |
|---|---|---|
| JP | U S56-030402 | 3/1981 |
| JP | S61-212098 | 9/1986 |
| JP | S61-212098 A | 9/1986 |
| JP | U H05-044461 | 6/1993 |
| JP | H05-044461 Y2 | 11/1993 |
| JP | H08-156698 | 6/1996 |
| JP | 2001-173636 | 6/2001 |
| JP | 2005-263317 | 9/2005 |
| JP | 2006-193883 | 7/2006 |
| JP | 2007-002890 | 1/2007 |
| TW | 1262242 | 9/2006 |

* cited by examiner

*Primary Examiner* — Jeffrey O Brien
(74) *Attorney, Agent, or Firm* — Manabu Kanesaka (57) ABSTRACT

A rotation control device is configured so that a spring force of a torsion coil spring holds an attitude of a rotation body at a pre-advancement position corresponding to a post-return position (a), and a post-advancement position corresponding to a pre-return position (b), respectively. The rotation control device includes a first rotation part supporting one end of the torsion coil spring and supported on a fixed body so as to rotate as the rotation body rotates, and a second rotation part rotatably supported on the fixed body at a first rotation part side and supporting the other end of the torsion coil spring. When the first rotation part rotates, the second rotation part rotates together with the first rotation part. A wound portion of the torsion coil spring is most elastically deformed when the rotation body is at an intermediate position (c) between the position (a) and the position (b).

4 Claims, 10 Drawing Sheets

ROTATION CONTROL DEVICE FOR ROTATION BODY

FIELD OF THE INVENTION

This invention relates to a rotation control device in which a spring force of a torsion coil spring holds an attitude of a rotation body at both a pre-advancement position and a post-advancement position, respectively. Also, when the rotation body crosses an intermediate position between both positions, the rotation body is forcibly rotated by the spring force.

BACKGROUND OF THE ART

There is a lid opening and closing apparatus in which a pressing force of a spring provided to a lid is inverted so that the lid is pressed and held at an open position and a closed position by the spring, respectively. (Patent Document 1) In the lid opening and closing apparatus, the spring is provided on a lid side and a box side in such a manner that a distance between both of spring ends of the spring (torsion coil spring) in an intermediate position between the open position and the closed position becomes narrow, and a distance between the open position and the closed position becomes wider than that at the intermediate position. In the intermediate position, both of the spring ends and the rotation center of the lid are positioned in the same straight line, so that the pressing force of the spring does not function in both directions where the lid is closed and opened. (i.e., a dead point)

Patent Document 1: Japanese Examined Utility Model Application

DISCLOSURE OF THE INVENTION

Problems to be Solved by the Invention

A main problem to be solved by the present invention is to provide the above-mentioned rotation control device and opening and closing device in which a rotation body can be stably positioned in a pre-advancement position and a post-advancement position, respectively, even if a small-sized torsion coil spring which has a relatively small spring force is used, and an operator can specifically recognize that the rotation body has reached an intermediate position of both positions.

Means for Solving the Problems

In order to solve the above-mentioned problem, in this invention, a rotation control device for a rotation body has the following structures of (1) to (4).

(1) a rotation control device in which a spring force of a torsion coil spring holds an attitude of the rotation body at both a pre-advancement position corresponding to a post-return position (a), and a post-advancement position corresponding to a pre-return position (b), respectively, comprising:

(2) a first rotation part supporting one end side of the torsion coil spring and being supported on a fixed body side so as to rotate as the rotation body rotates; and (3) a second rotation part rotatably supported on the fixed body side at a side of the first rotation part and supporting the other end side of the torsion coil spring, wherein (4) when the first rotation part rotates, the second rotation part rotates together, and a wound portion of the torsion coil spring is most elastically deformed in a state where the rotation body is at an intermediate rotational position (c) positioned between the position (a) and the position (b).

When the rotation body is rotated from the position (a) to the position (b), or from the position (b) to the position (a), the first rotation part rotates with it, and the second rotation part rotates together with the first rotation part. Accordingly, a distance between a supporting portion on one end side of the torsion coil spring and the other supporting portion on the other end side of the torsion coil spring can greatly change at the position (c) compared to a case where the other end of the spring is simply fastened on the fixed body side. As a result, when the rotation body is advanced or returned from the position (a) or the position (b), a spring force acting in a direction opposite to a rotational direction can be significantly increased, so that it is difficult for the rotation body in the position (a) and the position (b) to rotate further toward the position (c). Also, in the case that the rotation body is advanced or returned, an operator can specifically recognize the position (c) where forcible rotation starts.

One end or the other end of the torsion coil spring may be penetrated into the wound portion of the spring and supported at the first rotation part or the second rotation part through a spring holder having a supporting axis for supporting the wound portion of the spring and a supporting portion for the first rotation part or the second rotation part. In this case, an inclination or the like of the wound portion of the torsion coil spring is controlled, and while the spring is structured in a compact size, the spring can be combined to both the first rotation part and the second rotation part without interfering with the first rotation part or the second rotation part.

A sliding and contacting portion which is formed in both the first rotation part and the second rotation part or any one of the first rotation part and the second rotation part, may include a pressure contacting part provided with a slid and contacted portion which is always pressed by an urging force. Also, a projection formed in any one of the sliding and contacting portion and the slid and contacted portion may be entered into a depression formed in the other of the sliding and contacting portion and the slid and contacted portion by the urging force when the rotation body is positioned at both of the position (a) and the position (b) or any one of the position (a) and the position (b). In this case, a state where the rotation body is positioned in the position (a) or the position (b) can be further stably maintained. Specifically, in the case that the rotation body in the position (a) or the position (b) is advanced toward the position (c), in addition to a rotational force against a spring force of the torsion coil spring, a rotational force is required in order for the projection to slip out of the depression, so that the rotation body is positioned in the position (a) or the position (b) without wobbling. Also, in the case that the rotation body is rotatably advanced or returned toward the position (a) or the position (b), the projection can be pulled into the depression just before the rotation body reaches the position (a) or the position (b). As a result, the rotation body can be firmly rotatably advanced or returned to the position (a) or the position (b).

In this case, further, if the pressure contacting part is combined with the fixed body side so as to be movable and adjustable to a circumferential direction relative to a rotation axis of the first rotation part or the second rotation part, the position of the second rotation part, for example, in the position (a) and the position (b) can be also adjusted in the circumferential direction relative to the rotation axis by changing the position to combine the pressure contacting part with the fixed body side. When the position of the second rotation part is changed, a positional relationship between a supporting portion of one end of the torsion coil spring of the first rotation part and a supporting portion of the other end of the torsion coil spring of the second rotation part, changes as well. Accordingly, the intermediate rotational position (c) of the rotation body where the wound portion of the torsion coil spring is most elastically deformed can be changed.

Also, in this case, furthermore, if two or more combining portions, which are combined with combined portions formed in the fixed body side with a space in the circumferential direction relative to the rotation axis of the first rotation part or the second rotation part, are provided to the pressure contacting part, the combining position of the pressure contacting part with the fixed body side can be easily changed by combining any one of the combining portions with the combined portions.

Effects of the Invention

According to a rotation control device of the present invention, a space between both ends of a torsion coil spring can be greatly changed at the intermediate position of the rotation by a first rotation part which is rotated with the rotation of a rotation body and a second rotation part which rotates together with the first rotation part. As a result, even in a case that the torsion coil spring is a small-sized torsion coil spring with a relatively small spring force, when the rotation body is rotated toward the intermediate position from a pre-advancement position or a post-advancement position, a strong resistance opposite to a rotation direction can be provided to the rotation body, and the rotation body can be stably positioned at both the pre-advancement position and the post-advancement position, respectively. Therefore, the movement of the rotation body becomes sharp, and also an operator can specifically recognize that the rotation body has reached the intermediate position between said two positions.

BEST MODE FOR CARRYING OUT THE INVENTION

Hereinafter, the best mode for carrying out the present invention will be explained with reference to FIGS. 1 to 10.

Figure 1:
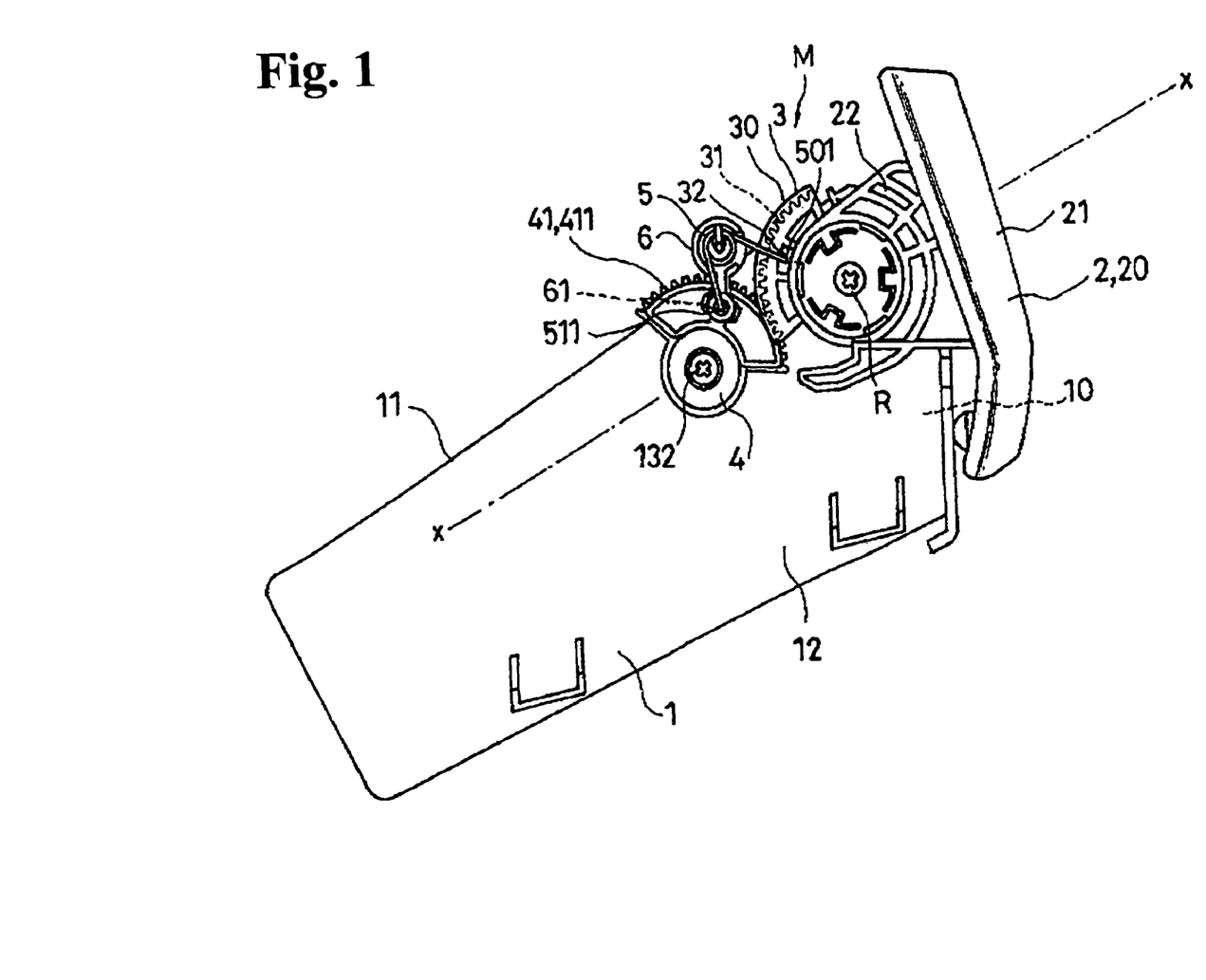
FIG. 1 is a side view of an example of an application of a rotation control device according to the invention.
Figure 2:
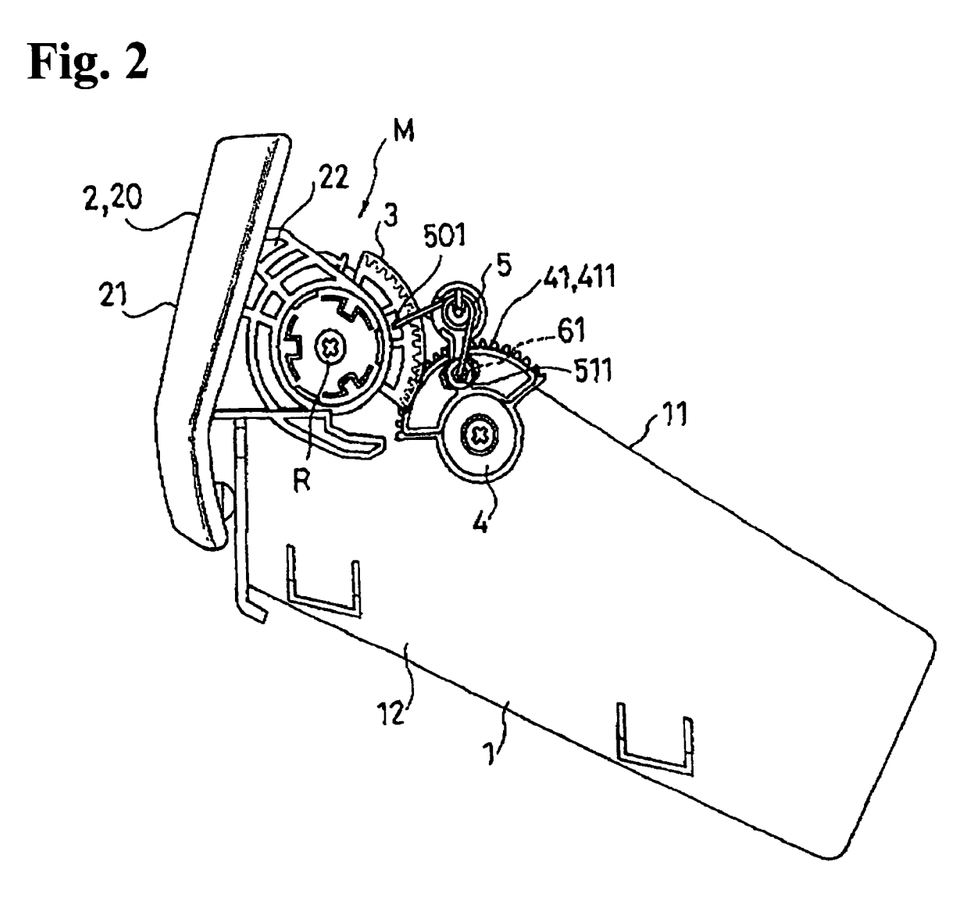
FIG. 2 is a side view of the example of the application of the rotation control device according to the invention.
Figure 3:
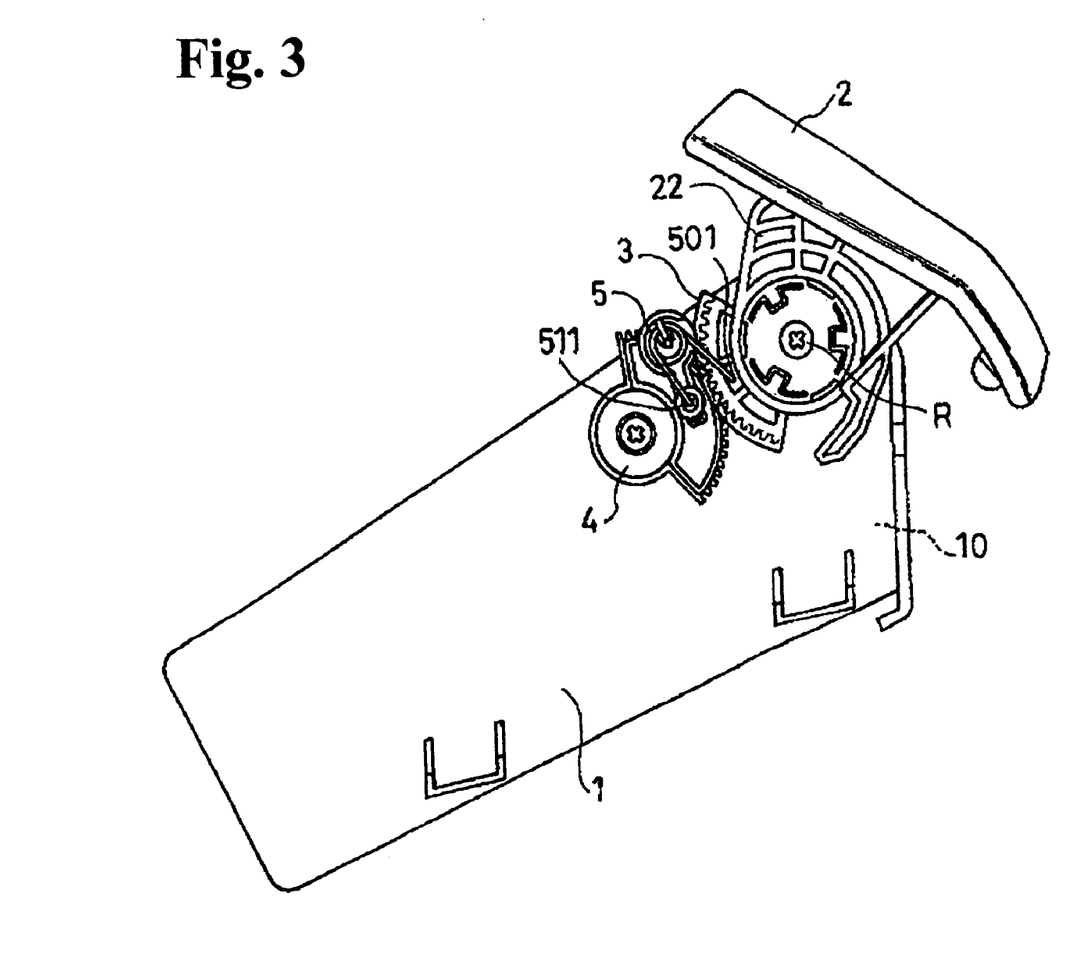
FIG. 3 is a side view of the example of the application of the rotation control device according to the invention.
Figure 4:
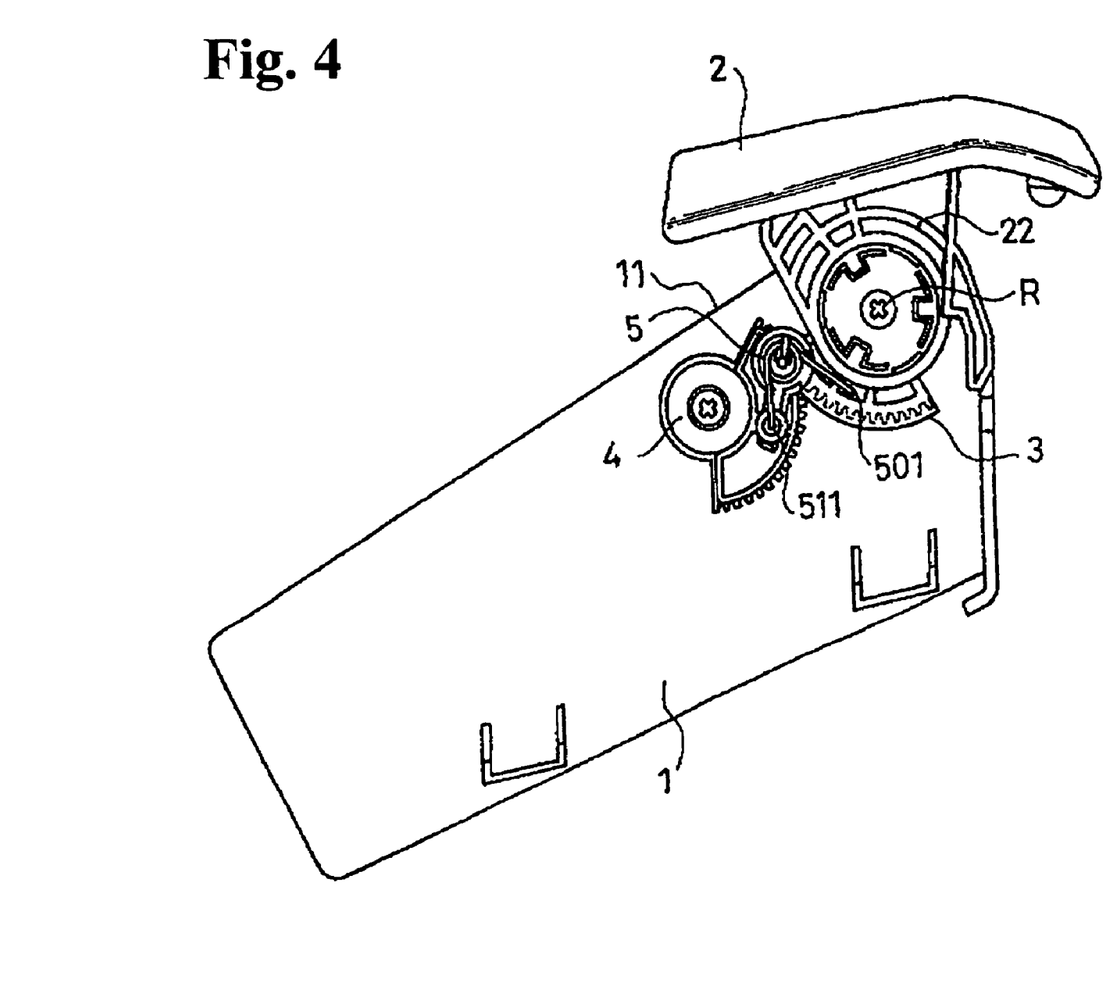
FIG. 4 is a side view of the example of the application of the rotation control device according to the invention.
Figure 5:
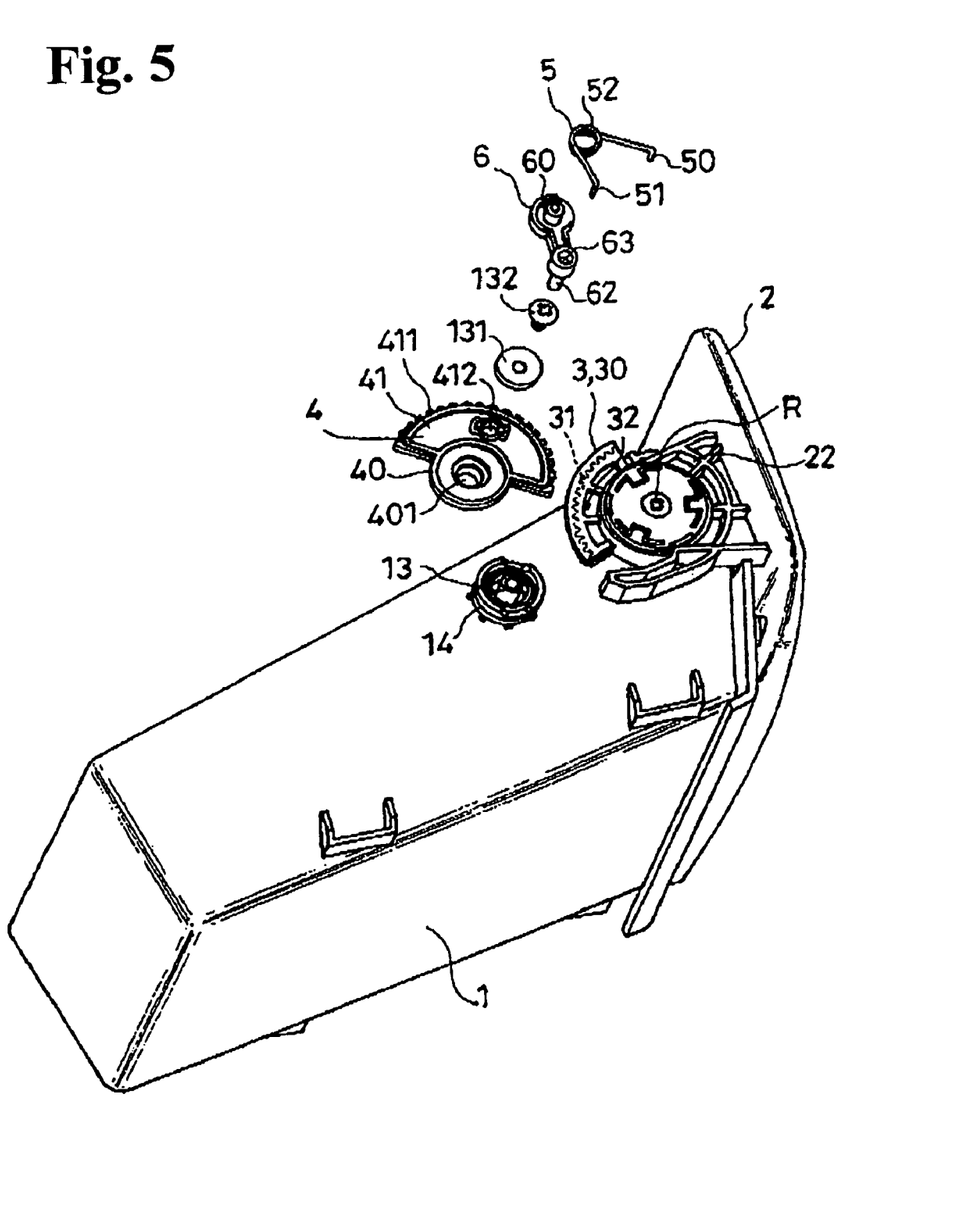
FIG. 5 is an exploded perspective view of essential parts thereof.
Figure 6:
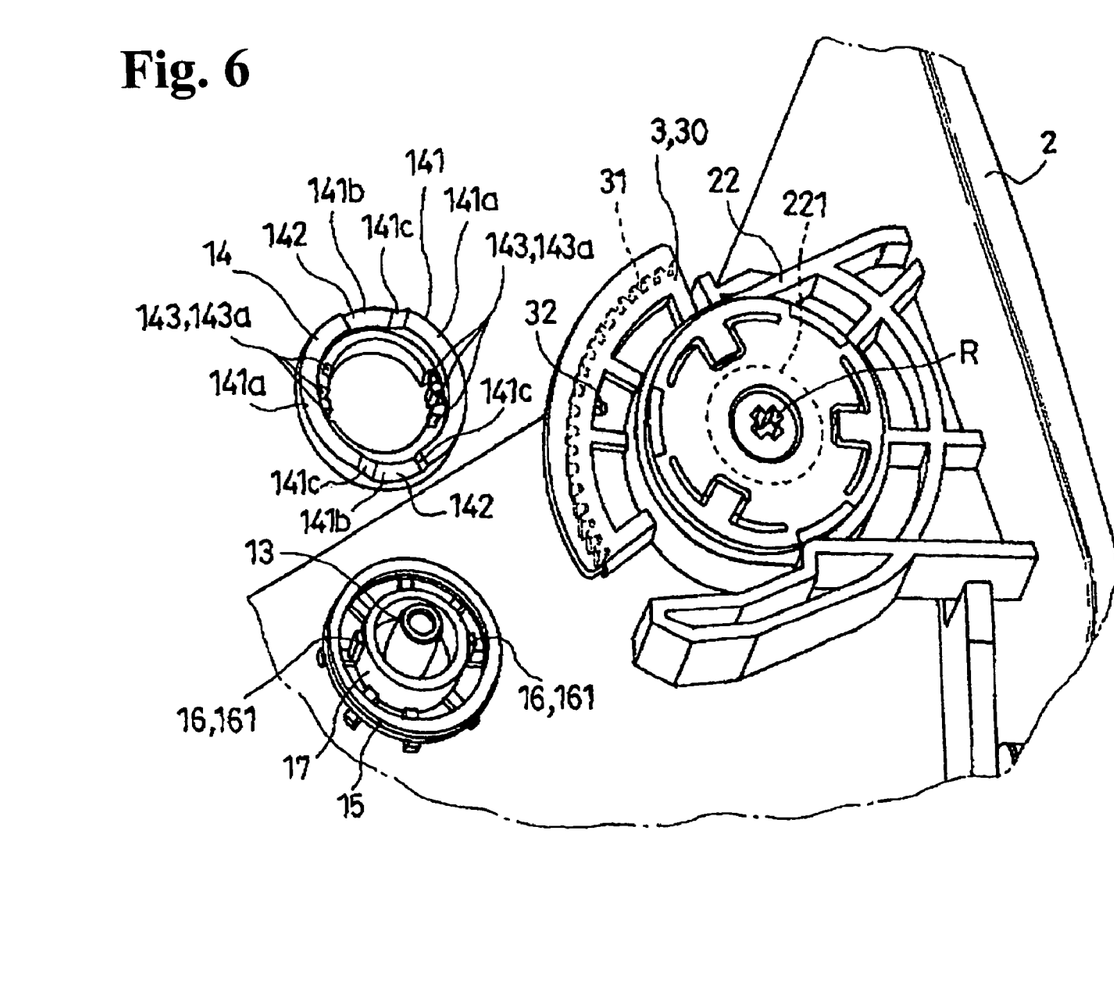
FIG. 6 is an exploded perspective view of essential parts thereof.
Figure 7:
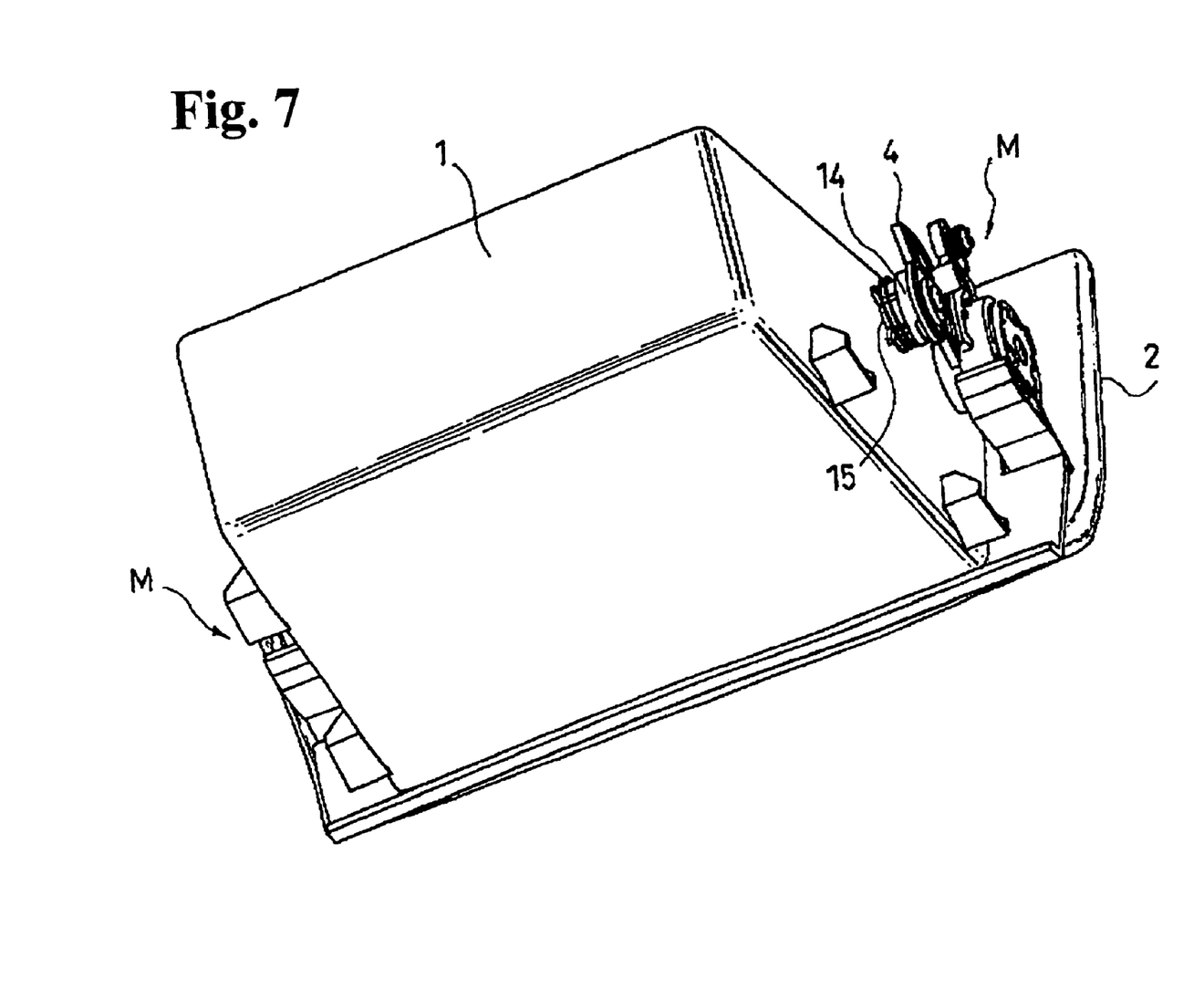
FIG. 7 is a perspective view of a rear side thereof.
Figure 8:
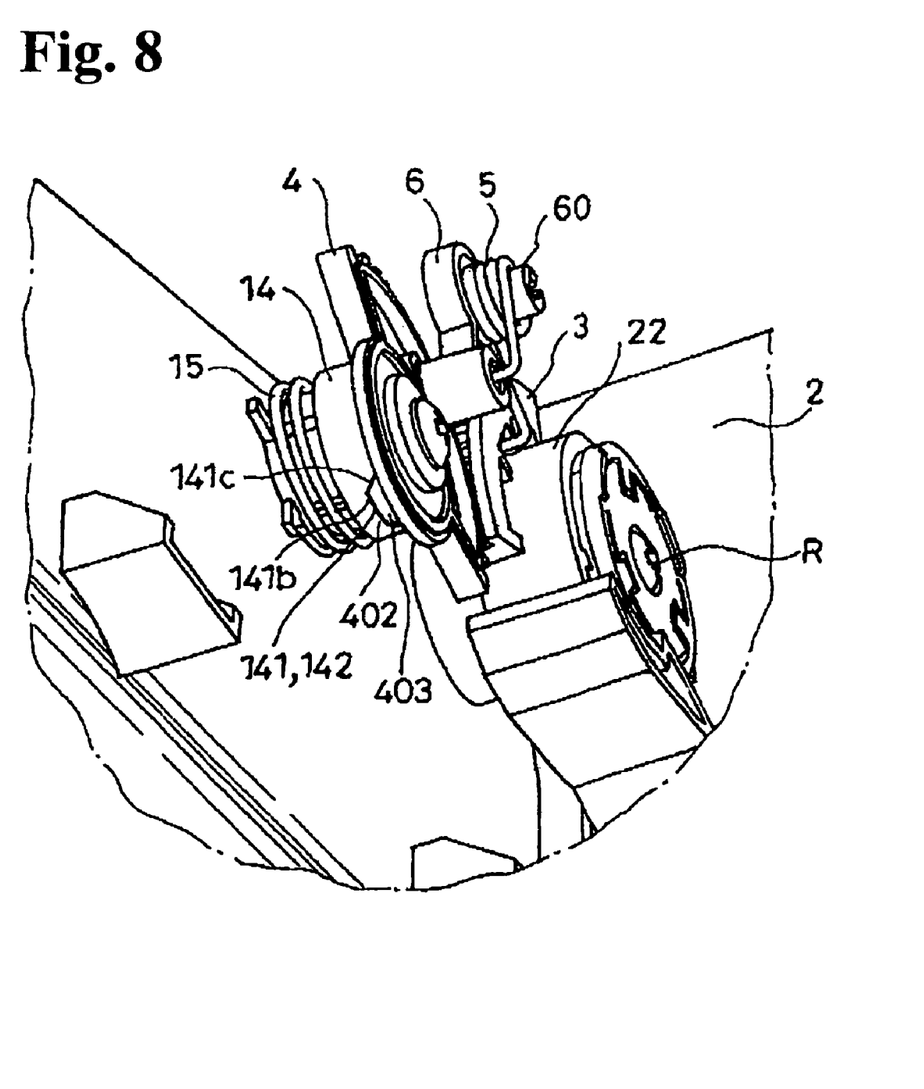
FIG. 8 is a perspective view of the essential parts in FIG. 7.
Figure 9:
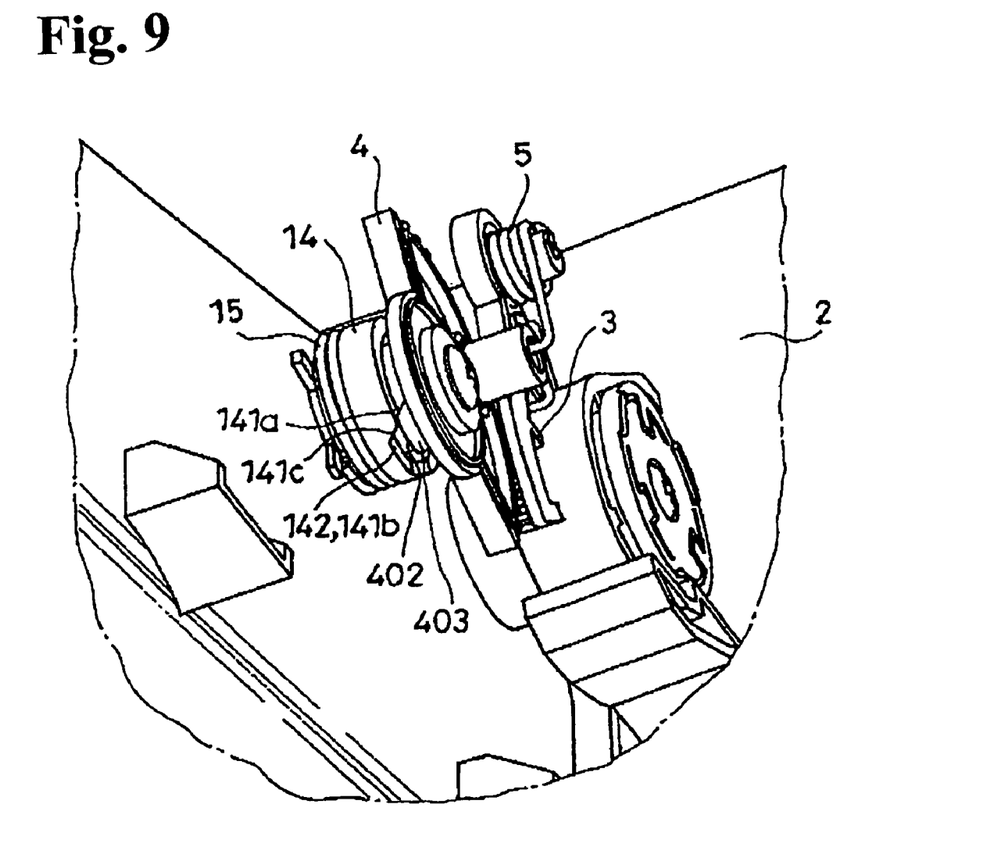
FIG. 9 is a perspective view of the essential parts when a lid is slightly rotated from a state in FIG. 7.
Figure 10:
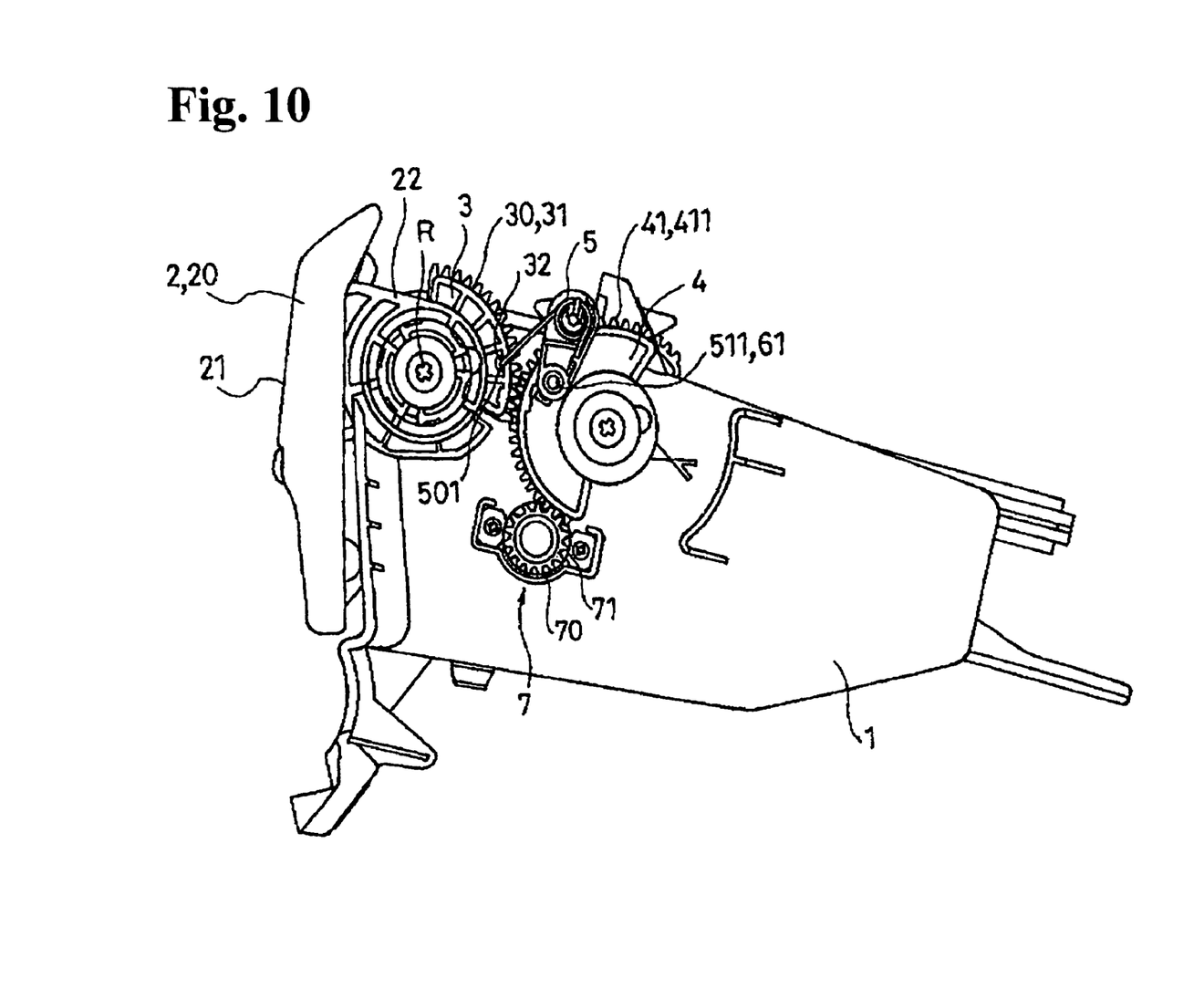
FIG. 10 is a side view of another configuration example.

Incidentally, here, FIGS. 1, 2, and 7 show a state including a lid 20 as a rotation body 2 in a pre-advancement position (a) (=a post-return position (a)) viewing from one side wall 12 of a fixed body 1 (FIG. 1); viewing from the other side wall 12 of the fixed body 1 (FIG. 2); or viewing from a back face side of the fixed body 1 (FIG. 7), respectively. FIG. 3 shows a state of the lid 20 in an intermediate rotational position (c), and FIG. 4 shows a state of the lid 20 in a post-advancement position (b) (=a pre-return position (b)), respectively. FIG. 5 shows a state wherein a torsion coil spring 5 comprising a rotation control device M and a second rotation part 4 are separated, and FIG. 6 shows a state of a pressure contacting part 14 which is pressed against sliding and contacting portions 402 of the second rotation part 4. FIG. 8 shows a combined state of the sliding and contacting portions 402 and the pressure contacting part 14 in the position (a), and FIG. 9 shows a combined state of the sliding and contacting portions 402 and the pressure contacting part 14 when the lid 20 is slightly rotated from the state in FIG. 8, respectively. Also, FIG. 10 shows an example wherein one portion of the structure of the rotation control device M shown in FIGS. 1 to 9 is changed.

In the rotation control device M according to the embodiment, a spring force of the torsion coil spring 5 holds the attitude of the rotation body 2 combined to be rotatable relative to the fixed body 1 at both the pre-advancement position in other words the post-return position (a) (position in FIG. 1) and the post-advancement position in other words the pre-return position (b) (position in FIG. 4), respectively. Also, when the rotation body 2 crosses the intermediate position (c) (position in FIG. 3) of both the positions (a) and (b) due to the advancement rotation, the rotation body 2 is forcibly advanced to the position (b) by the spring force, and when the rotation body 2 crosses the intermediate position (c) due to the return rotation, the rotation body 2 is forcibly returned to the position (a) by the spring force.

The rotation control device M can be used for controlling the rotation of the rotation body 2 provided in various types of goods, fixture and furniture, and the like, for example, a door, lid, arm, and the like.

In each figure, the rotation body 2 is shown as an example of the lid 20 wherein an open portion 10 of the fixed body 1 with a box shape whose front face is open is blocked in the position (a), and completely opened in the position (b). Specifically, in the example in each figure, the fixed body 1 functions as an accessory pouch of an automotive interior equipment. The fixed body 1 is attached to a panel face of an instrument panel in such a way that the rear side from the open portion 10 of the fixed body 1 is embedded in the panel so that the front face of the lid 20 becomes a continuous face for design.

In the example shown in the figures, a front face 21 of the lid 20 in the position (a) is arranged in a longitudinal direction so as to block the open portion 10 of the fixed body 1. From there, the lid 20 rotates upward. In the position (b), the upper portion of the lid 20 positioned on the upper side than a rotational axis (position of an axis body R) of the lid 20 in the position (a) is positioned on the external surface of an upper wail 11 of the fixed body 1. (FIG. 4) The lid 20 is provided with a bearing portion 22 projecting to the rear side on both right and left sides in the position (a), respectively.

In the example shown in the figures, an axis body R which penetrates into an axis hole 221 formed in the bearing portion 22 and penetrating into the bearing portion 22 from side to side, is screwed in the side wall 12 of the fixed body 1. As a result, the lid 20, or the rotation body 2 is combined with the fixed body 1 to be rotatable relative to the axis body R.

The rotation control device M comprises elements of the following (1) to (3):
(1) a first rotation part 3;
(2) the second rotation part 4; and
(3) the torsion coil spring 5.

The first rotation part 3 supports one end 50 side of the torsion coil spring 5, and is supported on the fixed body 1 side so as to rotate as the rotation body 2 rotates.

In the example shown in the figures, a fan-like plate portion 30 projecting to the rear side is formed in the bearing portion 22 of the lid 20 in the position (a), and the fan-like plate portion 30 functions as the first rotation part 3. The fan-like plate portion 30 is integrally connected to the bearing portion 22 on a side opposite to an arc wise border 31 so that the arc wise border 31 faces backward. Also, the arc wise border 31 of the fan-like plate portion 30 is structured so as to form a rack shape. The fan-like plate portion 30 rotates relative to the axis body R as the lid 20 rotates.

The second rotation part 4 is rotatably supported on the fixed body 1 side on the lateral side of the first rotation part 3, and supports the other end 51 side of the torsion coil spring 5.

In the example shown in the figures, the second rotation part 4 is positioned at the back of the first rotation part 3, and provided with a discoid portion. 40 and a fan-like plate portion 41 integrally connected to the discoid portion 40. An arc wise border 411 of the fan-like plate portion 41 of the second rotation part 4 is also structured so as to form a rack shape. The arc wise border 411 of the fan-like plate portion 41 of the second rotation part 4 and the arc wise border 31 of the fan-like plate portion 30 of the first rotation part 3 are engaged with each other. Therefore, when the first rotation part 3 rotates as the lid 20, or the rotation body 2 rotates, the second rotation part 4 co-rotates with it.

In the example shown in the figures, an axis projection 13 projecting from the side wall of the fixed body 1 is penetrated into an axis hole 401 penetratingly provided at the center of the discoid portion 40 of the second rotation part 4. A fixed screw 132 is screwed to the projecting end of the axis projection 13 through a seat plate body 131, so that the second rotation part 4 is provided in the fixed body 1 so as to rotate relative to the axis projection 13.

In the example shown in the figures, the sliding and contacting portions 402 are formed on a side facing the side wall 12 of the fixed body 1 in the discoid portion 40 of the second rotation part 4. Also, the pressure contacting part 14, including a slid and contacted portion 141 which is always pressed against the sliding and contacting portions 402 by an urging force, is provided between the discoid portion 40 and the side wall 12. Also, the sliding and contacting portions 402 are provided with projections 403, and the projections 403 are entered into depressions 142 formed in the slid and contacted portion 141 by the urging force when the lid 20 (the rotation body 2) is in the position (a).

The projections 403 are formed on the lateral side of the axis hole 401 in the discoid portion 40. Projecting ends of the projections 403 function as the sliding and contacting portions 402.

On the other hand, the pressure contacting part 14 is structured so as to form a ring shape which penetrates the axis projection 13 inside. The slid and contacted portion 141 is formed so as to form a circling shape on a side facing the discoid portion 40 in the pressure contacting part 14. The slid and contacted portion 141 comprises two cam faces 141a, 141b with different heights, and also inclined surfaces 141c, which gradually rise toward higher cam face 141a sides from lower cam face 141b sides positioned on the side wall 12 side, are formed between both cam faces 141a, 141b.

A compression coil spring 15 is provided between the pressure contacting part 14 and the side wall 12 of the fixed body 1 in a state of winding around the outside of the axis projection 13, and due to the spring 15, the slid and contacted portion 141 is always pressed against the sliding and contacting portions 402. Specifically, any one of the cam faces 141a, 141b is always pressed against the projecting ends of the projections 403.

In the example shown in the figures, when the lid 20 is in the position (a), the sliding and contacting portions 402 of the projections 403 are pressed against the low cam faces 141b which become the depressions 142 of the slid and contacted portion 141 by an urging force. (FIG. 8) When the lid 20 is advanced against a spring force of the torsion coil spring 5, the second rotation part 4 is also rotated with it, so that the projections 403 are pressed against the inclined surfaces 141c, and run on the inclined surfaces 141c. Accordingly, the pressure contacting part 14 is moved to the side wall 12 side of the fixed body 1 against an urging force of the spring 15, and the projections 403 are run on the high cam faces 141a of the slid and contacted portion 141. (FIG. 9)

Therefore, in the example shown in the figures, a state of the rotation body 2 in the position (a) can be stably held further. Specifically, in the case that the rotation body 2 in the position (a) is advanced toward the position (c), in addition to a rotating force against the spring force of the torsion coil spring 5, a rotating force pulling the projections 403 out of the depressions 142 of the slid and contacted portion 141 is required, and the rotation body 2 is positioned in the position (a) without wobbling. Also, in the case that the rotation body 2 is returned toward the position (a), the projections 403 can be pulled into the depressions 142 of the slid and contacted portion 141 just before the rotation body 2 reaches the position (a). Therefore, the rotation body 2 can be firmly rotationally returned to the position (a). Specifically, in the example shown in the figures, without changing the force required when the lid 20 is closed, the force required when the lid 20 is opened is increased in the first stage of the operation.

Also, in the example shown in the figures, the pressure contacting part 14 is combined with the fixed body 1 side so as to be movable and adjustable to a circumferential direction relative to the axis projection 13 which is the rotation axis of the second rotation part 4. In the example shown in the figures, the projections 403 which become the sliding and contacting portions 402 are provided on both sides of a diameter direction relative to the rotation axis. Also, the depressions 142 of the slid and contacted portion 141 is provided on both sides of the diameter direction, and the projections 403 are entered into the depressions 142 without any space in the position (a).

If a combined position of the pressure contacting part 14 with the fixed body 1 side is changed, the position of the depressions 142 of the slid and contacted portion 141 is changed as well. Therefore, the position of the second rotation part 4 in the position (a) can be also adjusted in the circumferential direction relative to the rotation axis. If the position of the second rotation part 4 is changed, a positional relationship between a supporting portion 501 of one end 50 of the torsion coil spring 5 in the first rotation part 3 and a supporting portion 511 of the other end 51 of the torsion coil spring 5 in the second rotation part 4, changes as well. Accordingly, the intermediate rotation position (c) of the rotation body 2 wherein a wound portion 52 of the torsion coil spring 5 is most elastically deformed, can be changed.

In the example shown in the figures, the pressure contacting part 14 forms two or more combining portions 143 which are combined with combined portions 16 formed in the fixed body 1 side with a space in the circumferential direction relative to the rotation axis of the first rotation part 3 or the second rotation part 4.

In the example shown in the figures, a sleeve portion 17 where the axis projection 13 is housed inside is formed on the side wall 12 of the fixed body 1. Also, ribs 161 positioned outside of the sleeve portion 17 and extending to an axis line direction of the sleeve portion 17 are formed on both sides of the diameter direction. On the other hand, three cutting grooves 143a, each allowing the corresponding rib 161 to penetrate, are provided in both side positions of the diameter direction inside the pressure contacting part 14 with a space in a circumferential direction of the pressure contacting part 14.

The ribs 161 are fitted into any one of the cutting grooves 143a, so that the combined position of the pressure contacting part 14 with the fixed body 1 side can be changed. Specifically, in the example shown in the figures, the ribs 161 function as the combined portions 16, and the cutting grooves 143a function as the combining portions 143.

The torsion coil spring 5 is provided in a way that the wound portion 52 is most elastically deformed in a state where the rotation body 2 is in the intermediate rotation position (c) between the position (a) and the position (b). B1

In the example shown in the figures, one end 50 of the torsion coil spring 5 enters into a supporting hole 32 formed in the fan-like plate portion 30 of the first rotation part 3, and supported at the first rotation part 3. On the other hand, the other end 51 of the spring 5 is supported at the second rotation part 4 through a spring holder 6 provided with a supporting axis 60 supporting the wound portion 52 and a supporting portion 61 for the second rotation part 4. The spring holder 6 includes an axis portion 62 penetrating into an axis hole 412 formed in the fan-like plate portion 41 of the second rotation part 4 on the back side of one end side. The axis portion 62 becomes the supporting portion 61, and the spring holder 6 is structured so as to form an elongated plate shape with the supporting axis 60 on the upper side of the other end side. The other end 51 of the spring is penetrated into a supporting hole 63 formed in the spring holder 6 in a formation position of the axis portion 62, and supported at the second rotation part 4 in the axis portion 62 through the spring holder 6. Due to the spring holder 6, an inclination or the like of the wound portion 52 of the torsion coil spring 5 is controlled, and while the spring 5 is structured in a small size, the spring 5 is combined with the first rotation part 3 and the second rotation part 4 so as not to interfere with the first rotation part 3 or the second rotation part 4.

In the example shown in the figures, when the rotation body 2 is in the position (a), the supporting portion 501 on one end 50 side of the spring and the axis portion 62 of the spring holder 6, or the supporting portion 511 on the other end 51 side of the spring are both positioned on the upper side of one side of a virtual straight line x connecting the rotation center of the first rotation part 3 and the rotation center of the second rotation part 4, or on the upper side of the virtual straight line x. A space between both supporting portions 501, 511 is wider than that at the time when the rotation body 2 is in the position (c).

When the rotation body 2 is in the position (b), the supporting portion 501 of one end 50 side of the spring and the supporting portion 511 of the other end 51 side of the spring are both positioned on the other side of the virtual straight line x connecting the rotation center of the first rotation part 3 and the rotation center of the second rotation part 4, or on the lower side of the virtual straight line x. The space between both supporting portions 501, 511 is wider than that at the time when the rotation body 2 is in the position (c).

When the rotation body 2 is in the position (c), the supporting portion 501 of one end 50 side of the spring and the supporting portion 511 of the other end 51 side of the spring are both positioned approximately on the virtual straight line x connecting the rotation center of the first rotation part 3 and the rotation center of the second rotation part 4. At this time, the space between both supporting portions 501, 511 becomes the narrowest.

When the rotation body 2 rotates toward the position (b) from the position (a), or toward the position (a) from the position (b), the first rotation part 3 rotates with the rotation body 2, and the second rotation part 4 rotates together with the first rotation part 3. Accordingly, the space between the supporting portion 501 on one end 50 side of the torsion coil spring 5 and the supporting portion 511 on the other end 51 side of the torsion coil spring 5 can greatly change in the position (c) compared to the case that the other end 51 of the spring is simply attached to the fixed body 1 side. (In the example shown in the figures, the above-mentioned space can be greatly narrowed.) As a result, when the rotation body 2 is advanced or returned from a state in the position (a) or the position (b), a spring force acting in a direction opposite to a rotational direction can be significantly increased, so that the rotation body 2 in the position (a) and the position (b) is difficult to be rotated further toward the position (c). Also, in the case that the rotation body 2 is advanced or returned, an operator can specifically recognize the position (c) where the forcible rotation starts.

In the example shown in the figures, the side wall 12 on the left side of the fixed body 1 and the lid 20, or the bearing portion 22 on the left side of the rotation body 2 are coordinated by the rotation control device M explained in the above. Also, the side wall 12 on the right side of the fixed body 1 and the lid 20, or the bearing portion 22 on the right side of the rotation body 2. are coordinated by the rotation control device M explained in the above.

FIG. 10 shows an example wherein braking is provided for the rotation of the second rotation part 4, i.e., the rotation of the first rotation part 3, and further the lid 20 by a damper device 7 comprising a rotor (not shown) and a stator 71. As a rack of the arc wise border 411 of the fan-like plate portion 41 of the second rotation part 4, the rotor is provided with a pinion 70 engaging with the rack on the outer end of the rotor, and the stator 71 houses the rotor to be rotatable and is fixed to the outside of the side wall 12 of the fixed body 1. Inside the stator 71, viscous fluid such as silicon oil and the like is enclosed. Therefore, a resistance is provided for the rotation of the rotor, and braking is provided for the rotation of the second rotation part 4 connected to the rotor through the pinion 70.

Incidentally, all contents of the specification, claims, figures, and abstract of Japanese Patent Application No. 2007-063585 filed on Mar. 13, 2007 are cited herein and incorporated as the disclosure of the specification of the present invention.

What is claimed is:

1. A rotation control device connected to a rotation body and a fixed body for maintaining an attitude of the rotation body relative to the fixed body at a pre-advancement position corresponding to a post-return position (a), and a post-advancement position corresponding to a pre-return position (b), respectively, comprising:
   a first rotation part supported on the fixed body so as to rotate as the rotation body rotates,
   a second rotation part rotatably supported on the fixed body at a side of the first rotation part,
   a torsion coil spring having one end supported by the first rotation part, the other end supported by the second rotation part, and a wound portion between the one and the other ends, and
   a spring holder having a supporting axis passing through the wound portion and a supporting portion for supporting the first rotation part or the second rotation part,
   wherein when the first rotation part rotates, the second rotation part rotates together with the first rotation part, and the wound portion of the torsion coil spring is most elastically deformed when the rotation body is at an intermediate rotational position (c) positioned between the position (a) and the position (b), and the one end or the other end of the torsion coil spring is supported at the first rotation part or the second rotation part through the spring holder.

2. A rotation control device connected to a rotation body and a fixed body for maintaining an attitude of the rotation body relative to the fixed body at a pre-advancement position corresponding to a post-return position (a), and a post-advancement position corresponding to a pre-return position (b), respectively, comprising:

a first rotation part supported on the fixed body so as to rotate as the rotation body rotates, a second rotation part rotatably supported on the fixed body at a side of the first rotation part, a torsion coil spring having one end supported by the first rotation part, the other end supported by the second rotation part, and a wound portion between the one and the other ends, wherein when the first rotation part rotates, the second rotation part rotates together with the first rotation part, and the wound portion of the torsion coil spring is most elastically deformed when the rotation body is at an intermediate rotational position (c) positioned between the position (a) and the position (b), and a pressure contacting part having a slid and contacted portion always pressed by an urging force to a sliding and contacting portion, and formed in the second rotation part, wherein one of the sliding and contacting portion and the slid and contacted portion includes a projection configured to enter into a depression formed in the other of the sliding and contacting portion and the slid and contacted portion by the urging force when the rotation body is positioned at one or both of the position (a) and the position (b).

3. The rotation control device for a rotation body according to claim 2, wherein the pressure contacting part is combined with the fixed body so as to be movable and adjustable in a circumferential direction around a rotation axis thereof.

4. The rotation control device for a rotation body according to claim 3, wherein the pressure contacting part includes two or more combining portions for being combined with combined portions formed in the fixed body, said combining portions being spaced from each other in the circumferential direction around the center of the rotation axis.

* * * * *